United States Patent [19]
Slater et al.

[11] Patent Number: 5,585,063
[45] Date of Patent: Dec. 17, 1996

[54] APPARATUS AND METHOD FOR COOLING HOT DISK-SHAPED OBJECTS

[75] Inventors: Daniel A. Slater; Patrick J. Kline; Robert E. Marowski, all of Rochester, N.Y.

[73] Assignee: Eastman Kodak Company, Rochester, N.Y.

[21] Appl. No.: 304,348

[22] Filed: Sep. 12, 1994

[51] Int. Cl.$^6$ ................................................ B29C 71/02
[52] U.S. Cl. ............................ 264/348; 62/381; 198/624; 425/73; 425/445; 425/446; 264/2.6
[58] Field of Search ........................... 425/445, 446, 425/73, 74, 75, 810; 264/2.6, 106, 1.33, 234, 235, 237, 340, 345, 346, 348, 85, 310; 62/381, 380, 374; 198/624, 626.1, 817; 414/935

[56]    References Cited
U.S. PATENT DOCUMENTS

| | | |
|---|---|---|
| 3,008,721 | 11/1961 | Corbett, Jr. et al. . |
| 3,610,391 | 10/1971 | Beck ........................ 198/624 |
| 3,977,566 | 8/1976 | Hill et al. ................... 414/935 |
| 3,982,890 | 9/1976 | Lovell . |
| 4,059,382 | 11/1977 | Kobayashi et al. ............ 425/446 |
| 4,132,518 | 1/1979 | Rips ......................... 425/445 |
| 4,145,169 | 3/1979 | Shows ....................... 425/446 |
| 4,217,977 | 8/1980 | Tam ......................... 414/935 |
| 4,290,734 | 9/1981 | Van Breen ................... 198/617 |
| 4,743,156 | 5/1988 | Raffay et al. ................ 414/935 |
| 4,754,445 | 6/1988 | Young et al. ................. 369/37 |
| 4,820,106 | 4/1989 | Walde et al. ................. 414/217 |
| 4,886,592 | 12/1989 | Anderle et al. ............... 204/298 |
| 4,938,649 | 7/1990 | ter Horst et al. .............. 198/626.1 |
| 4,942,565 | 7/1990 | Lagadec ..................... 369/59 |
| 4,969,790 | 11/1990 | Petz et al. ................... 414/217 |
| 5,123,261 | 6/1992 | Cope ........................ 62/374 |
| 5,181,556 | 1/1993 | Hughes . |
| 5,340,399 | 8/1994 | Uftring et al. ............... 425/446 |
| 5,411,076 | 5/1995 | Matsunaga et al. . |

FOREIGN PATENT DOCUMENTS

| | | | |
|---|---|---|---|
| 3-296936 | 12/1991 | Japan ....................... | 264/348 |
| 5-57784 | 3/1993 | Japan ....................... | 425/445 |

Primary Examiner—Mathieu D. Vargot
Attorney, Agent, or Firm—Clyde E. Bailey, Sr.; Charles E. Snee, III

[57]    ABSTRACT

Substrates (D) for optical recording disks are supported substantially vertically while moving through a shroud (32) through which cooling gas is drawn or pumped. The substrates may be supported by spaced, toothed rings (18, 20, 24) on a carousel or by suitable conveyors (126–132; 136–142; 144–146).

30 Claims, 9 Drawing Sheets

APPARATUS AND METHOD FOR COOLING HOT DISK-SHAPED OBJECTS

DESCRIPTION

1. Technical Field

The invention concerns apparatus and methods for making recording disks. More particularly, the invention relates to apparatus and methods for handling and cooling hot plastic disk-like substrates used to produce compact, optical recording disks.

2. Background Art

Optical recording disks have been developed in recent years for use in recording audio and image data. U.S. Pat. No. 4,942,565 discloses one type of such disks. In one application of disks of this general type, developed by the Eastman Kodak Company, a disk-shaped substrate has been molded from a material such as polycarbonate plastic, cooled and then coated with an optically sensitive medium which can be selectively exposed to encode image data onto the disk. During manufacture, the molded substrates, as removed from the molding equipment, typically have had a temperature of about 240° F. Prior to the present invention, the hot substrates have been removed from the mold and accumulated on vertical stackpoles where they have been allowed to cool to a temperature proper for coating with the optically sensitive medium.

As the substrates have cooled on their stackpoles, they have exhibited a tendency to sag or deform in an undesirable and quite variable manner. Such deformations can affect the physical shape and optical characteristics of the substrate in ways which will adversely influence the usefulness of the coated disks for recording or playback. In addition, cooling on the stackpoles to a temperature proper for coating typically has taken several hours; so that, considerable quantities of work in progress have had to be maintained in buffer storage to ensure a suitable supply of cooled substrates for coating. Thus, a need has existed for an improved technique for cooling the hot, just-molded substrates to a proper coating temperature in less time and with minimal physical and optical deformation, compared to the known technique using stackpoles.

SUMMARY OF THE INVENTION

A primary objective of the present invention is to provide an improved technique for cooling optical disk substrates to coating temperature with minimal deformation.

A further objective of the invention is to provide such a cooling technique which yields properly cooled disks in a matter of minutes, thus minimizing any need for buffer storage upstream of a coating station.

These objectives are given only by way of illustrative examples; thus other desirable objectives and advantages inherently achieved by the disclosed invention may occur or become apparent to those skilled in the art. Nonetheless, the scope of the invention is to be limited only by the appended claims.

Our invention is defined by the claims. One embodiment of our apparatus is particularly well-suited for cooling hot, disk-shaped objects having opposite faces and a periphery. The apparatus may include a frame; a first support having a first plurality of spaced members each configured to engage the periphery of one of a plurality of the objects; a first mount supported by the frame and operatively connected to the first support to locate the first plurality to engage the objects at a first location on their peripheries; a second support having a corresponding second plurality of spaced members each configured to engage the periphery of one of the plurality of objects; and a second mount supported by the frame and operatively connected to the second support to locate the second plurality to engage the objects at a second location on their peripheries, whereby each of the objects is engaged at the first and second locations and supported substantially vertically between the first and second supports. As used in this specification, "substantially vertically" means that the disk-like objects are supported with the planes of their surfaces positioned in a range of ±10° either side of vertical, more preferably ±2° either side of vertical, to minimize any tendency of the hot disks to deform due to the effects of gravity or to contact each other during cooling. Though we have found that supporting the objects at their peripheries is particularly effective, those skilled in the art will appreciate that the objects also could be supported substantially vertically by engaging them at their centers. A shroud is supported by the frame, the shroud being positioned to at least partially enclose the objects engaged with the first and second supports. Means are provided for passing cooling gas through the shroud to cool the objects enclosed by the shroud. Finally, means are provided for moving the first and second supports along a path within the shroud; so that, the objects are cooled to the desired temperature by the time they leave the shroud.

An environmentally controlled enclosure may surround the apparatus, in which case the means for passing cooling gas may comprise at least one opening through the shroud; at least one conduit connected to the opening; and means, such as a conventional air conditioning system, connected to the conduit for drawing cooling gas from the enclosure, over the opposite faces of the objects and through the opening, as the objects move along the path. The path within the shroud may be curved, circular, serpentine or straight. The first and second supports each may comprise a ring and the first and second pluralities of spaced members each may comprise spaced teeth around their respective ring, the objects being engaged with the rings between the teeth. To minimize local distortion of the objects where they contact the supports, the first and second supports may be made from a material, such as acrylic or polycarbonate plastic, having a thermal conductivity in the range of 1 to 10 Btu-in/hr ft$^{2o}$ F. to reduce conduction of heat from the objects through the supports. Thus, heat is removed from the objects by radiation and by convection, more than by conduction.

While a pair of supports generally is sufficient, our apparatus also may include a third support having a corresponding third plurality of spaced members each configured to engage the periphery of one of the plurality of objects; and a third mount supported by the frame and operatively connected to the third support to locate the third plurality to engage the objects at a third location on their peripheries, whereby each of the objects is engaged at the first, second and third locations between the first, second and third supports. The third support also may be formed as a ring with teeth and may be made from the same material as the first and second supports.

The shroud includes an inlet end and an outlet end and the apparatus may further include means for placing hot objects between the first and second supports at the inlet end; and means for removing cool objects from between the first and second supports at the outlet end. The means for placing hot objects may include a bracket supported by the frame; means supported by the bracket for selectively holding or releasing one of the objects; and means supported by the bracket for moving the means for selectively holding or releasing from a pickup position spaced from the first and second supports to a placement position adjacent the first and second supports at the inlet end. The means for removing cool objects may include a bracket supported by the frame; means supported by the bracket for selectively holding or releasing one of the objects; and means supported by the bracket for moving the means for selectively holding or releasing from a pickup position adjacent the first and second supports at the outlet end to a release position spaced from the first and second supports.

In its broadest aspects, our method is particularly suited for cooling hot, disk-shaped objects having a periphery and may include the steps of supporting a plurality of the objects substantially vertically and in spaced relationship to each other; providing a shroud to at least partially enclose the objects as supported; passing cooling gas through the shroud to cool the objects enclosed by the shroud; and during the passing step, moving the objects as supported along a path within the shroud. The path may be straight, curved or circular. The objects may be supported on their peripheries or at their centers.

One particular embodiment of our method also is suited for cooling hot, disk-shaped objects having a periphery and may include the steps of providing a first support having first plurality of spaced members each configured to engage the periphery of one of a plurality of the objects; locating the first support so that the first plurality engage the objects at a first location on their peripheries; providing a second support having a corresponding second plurality of spaced members each configured to engage the periphery of one of the plurality of objects; locating the second support so that the second plurality engage the objects at a second location on their peripheries, whereby each of the objects is engaged and supported substantially vertically at the first and second locations between the first and second supports; providing a shroud to at least partially enclose the objects engaged with the first and second supports; passing cooling gas through the shroud to cool objects enclosed by the shroud; and during the passing step, moving the first and second supports along a path within the shroud. The path may be straight, curved, serpentine or circular. A third support may be provided in the manner indicated previously.

The apparatus and methods of our invention provide various advantages. Hot substrates are cooled to a temperature suitable for coating in a matter of minutes. The time to cool the substrates is reduced from as long as twelve hours to a range of 5 to 15 minutes. Also, deformation (that is, lack of planarity) in the axial direction of the substrates is reduced from a standard deviation range of 10.9 to 23.3 microns when prior art stackpoles are used, to a standard deviation range of 3.3 to 17.2 microns when the cooling is done in accordance with our invention. One known measurement of the optical properties of an optical recording disk is the birefringence of the disk. Optical disks with lower magnitudes of birefringence will perform better than those with higher magnitudes. Disks cooled on the prior art stackpoles exhibit a birefringence having a standard deviation in the range of 1.98 to 2.34 nanometers. In contrast to this, disks cooled in accordance with our invention exhibit a birefringence having a standard deviation in the range of 1.07 to 1.94 nanometers. This indicates that our method reduces greatly the variability of the birefringence of the optical recording disks.

BRIEF DESCRIPTION OF THE DRAWINGS

The foregoing and other objectives, features and advantages of the invention will be apparent from the following more particular description of the preferred embodiments of the invention, as illustrated in the accompanying drawings.

DESCRIPTION OF THE PREFERRED EMBODIMENTS

The following is a detailed description of the preferred embodiments of the invention, reference being made to the drawings in which the same reference numerals identify the same elements of structure in each of the several Figures.

Referring to FIGS. 1, 2, 5 and 6, the apparatus of our invention may include a rigid horizontal base plate or table 10 supported on a plurality of vertical legs 12. A motor driven indexer 14 is supported by table 10 and, in turn, supports a circular mounting plate or dial 16. On the upper surface of dial 16, concentric with indexer 14, is mounted a bottom support 18 made in the form of a ring gear whose spaced tooth members extend or open upwardly. An outer support 20, also concentric with indexer 14 and in the form of a ring gear whose spaced tooth members extend or open radially inwardly, is supported above dial 16 on a plurality of legs or spacers 22 distributed around the circumference of the ring. An inner support 24, also concentric with indexer 14 and in the form of a ring gear whose spaced tooth members extend or open radially outwardly, is supported above dial 16 and preferably in about the same plane as support ring 20, on a plurality of legs or spacers 26. Thus, as illustrated, disk substrates D may be positioned substantially vertically among supports 18, 20, 24; so that, each disk is engaged between a pair of the teeth on each of the supports. As illustrated, substrates D typically are circular in configuration with a central opening; however, other disk-like substrates also may be treated in accordance with our invention. The teeth of the supports are configured to provide a clearance between adjacent substrates in the range of 0.120 to 0.350 inch, to prevent the substrates from contacting and to provide an adequate pathway for flow of cooling gas.

Figure 5:
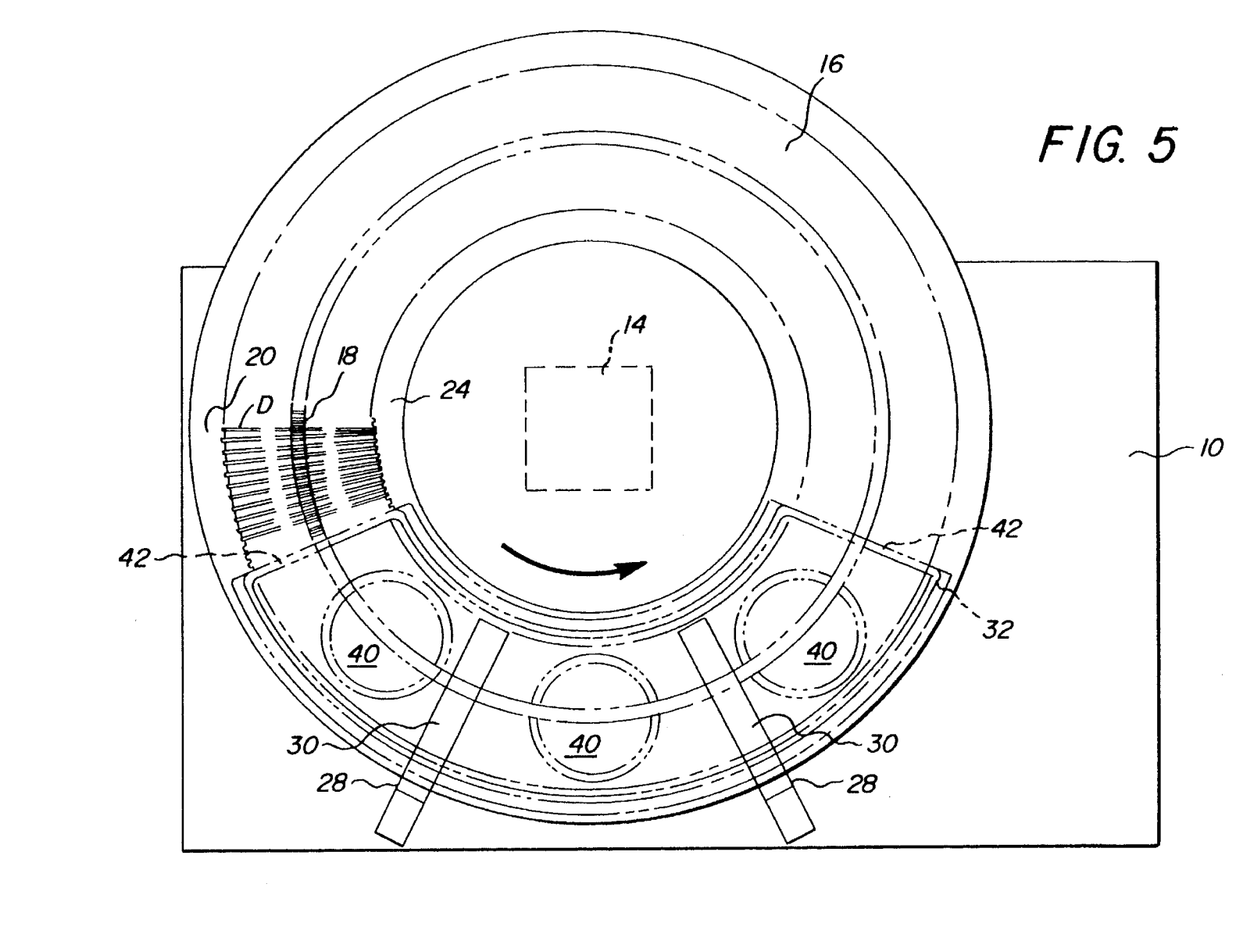
FIG. 5 illustrates an enlarged top view of the cooling apparatus of our invention.
Figure 6:
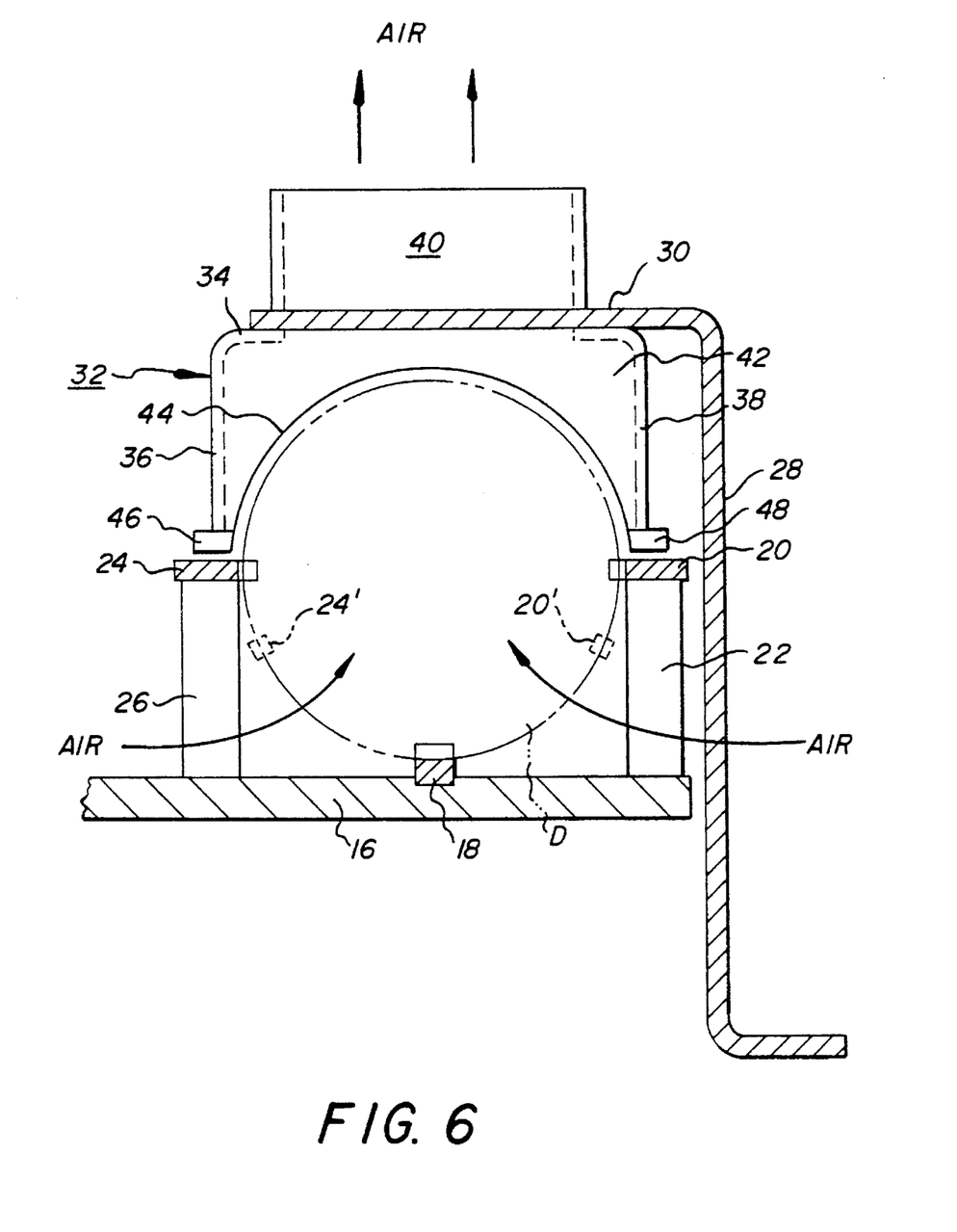
FIG. 6 is a view along line 6—6 of FIG. 2, illustrating the inlet end of the cooling apparatus.
Figure 7:
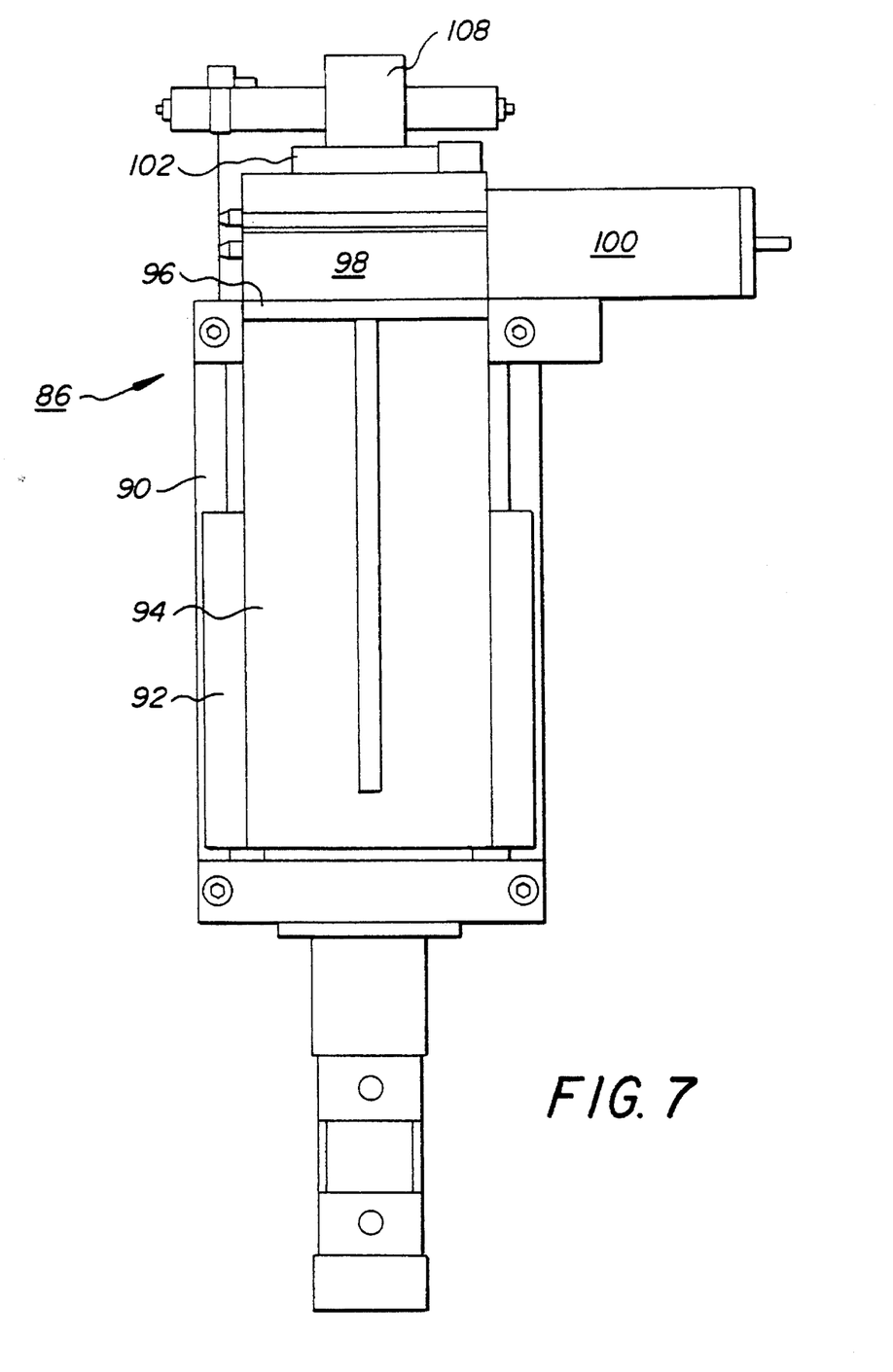
FIG. 7 is a view along line 7—7 of FIG. 1, illustrating the cool disk removal mechanism of our invention.
Figure 8:
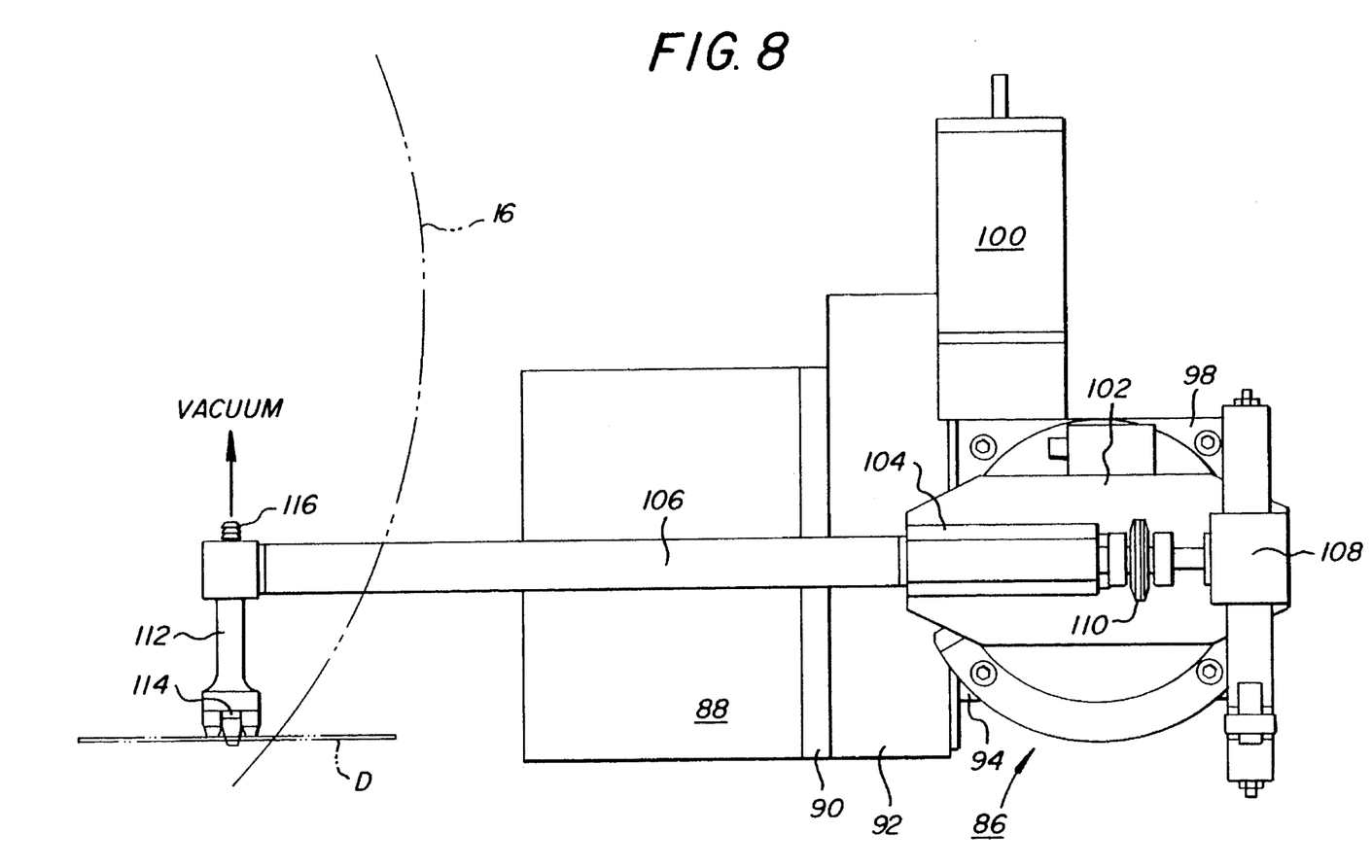
FIG. 8 illustrates a top view of the mechanism of FIG. 7.

Though supports 20, 24 are illustrated in a common plane to permit them to engage the substrates at about a horizontal diameter of each substrate D, those skilled in the art will appreciate that the two supports could be positioned at locations 20' and 24' shown in phantom lines below the horizontal diameter of substrate D and still provide adequate support for the substrates, even if support 18 were omitted. Preferably, supports 18, 20, 24 each are made from a material having a low thermal conductivity in the range of 1 to 10 Btu-in/hr ft$^{2o}$ F., to minimize conduction of heat away from the hot substrates and thereby minimize thermally induced distortion. Acrylic and polycarbonate plastics are suitable materials for supports 18, 20, 24. To prevent contact between adjacent substrates and to facilitate insertion and removal of the substrates, the positions of the supports about the substrates and the width of the spaces between the teeth of the supports preferably are chosen to hold each substrate within ±2° from vertical; however, a range of ±10° from vertical is considered acceptable.

Supported on table 10 are a pair of circumferentially spaced support brackets 28 having radial arms 30 which extend above supports 18, 20, 24. Suspended beneath arms 30 is an arcuate hood or shroud 32 having inner and outer radii of curvature essentially the same as those of supports 24 and 20, respectively. Shroud 32 may be made from sheet metal, for example, and comprises an arcuate top wall 34 from which depend a curved, radially inner wall 36 which ends just above support 24 and a curved, radially outer wall 38 which ends just above support 20. Those skilled in the art will appreciate that walls 36, 38 may be extended below the levels of supports 20, 24 without departing from the scope of our invention. Top wall 34 is pierced by a plurality of outlet ducts 40. In the illustrated embodiment, shroud 32 has a circumferential extent of about 135°; however, those skilled in the art will appreciate that the circumferential length of the shroud may vary depending on factors such as the temperature of the hot substrates, the rate of rotation of dial 16 and the rate of flow and temperature of the cooling gas passing through the shroud. As shown in FIGS. 5 and 6, shroud 32 further includes inlet and outlet end walls 42 having a semi-circular opening which extends downward just above supports 20, 24. The lower edges of shroud 32 may be provided with arcuate stiffener flanges 46, 48.

Figure 1:
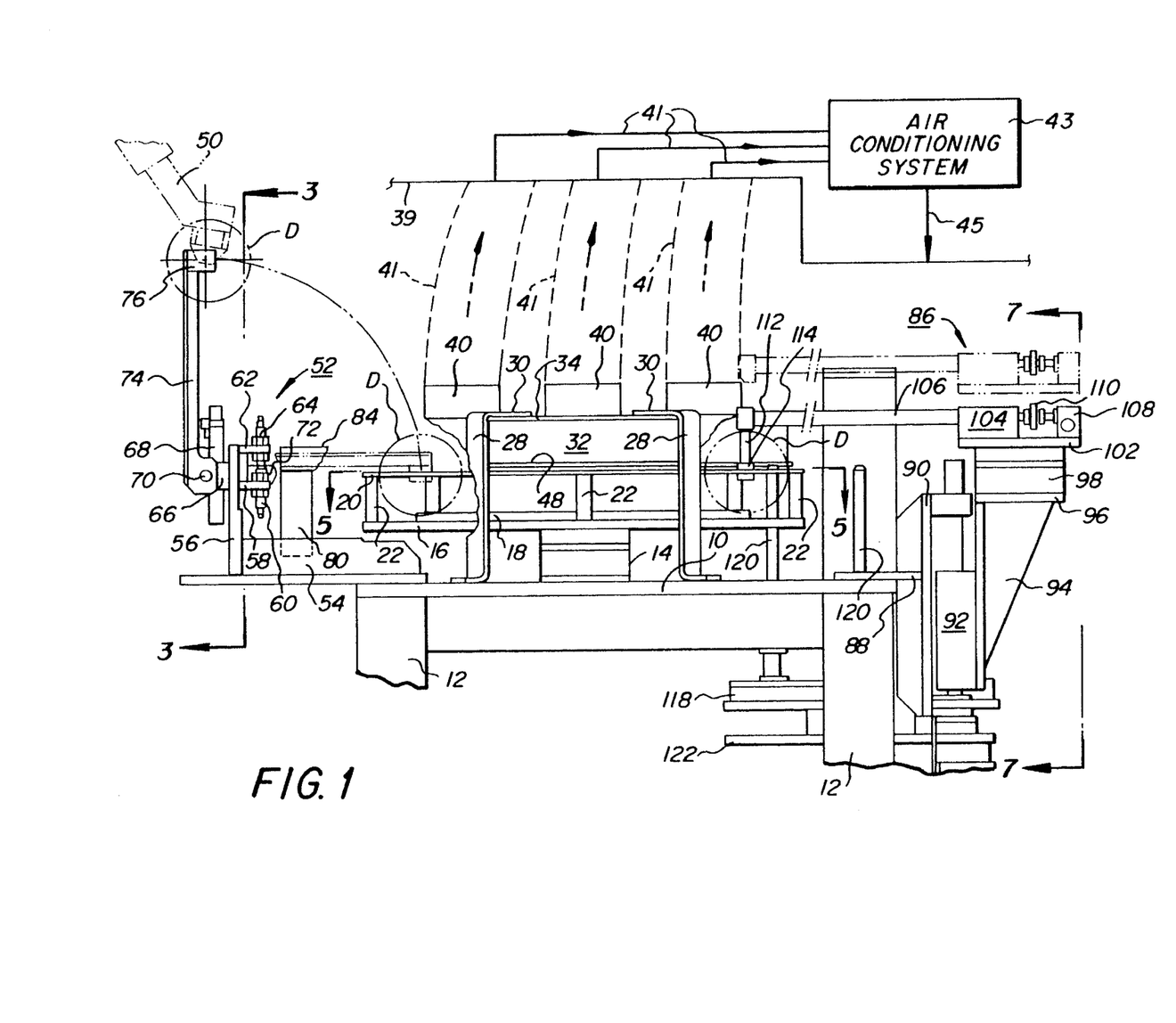
FIG. 1 illustrates an elevation view, partially schematic and partially broken away, of an apparatus according to our invention.

As illustrated schematically and fragmentarily in FIG. 1, the entire apparatus of the invention is enclosed within an environmentally controlled enclosure 39. A plurality of gas flow conduits or trunks 41 are provided from ducts 40 through the wall of enclosure 39 and are connected to the gas or air inlet of a conventional air conditioning system 43. Other cooling gases such as nitrogen or inert gases also may be used. After conditioning, the air from system 43 is returned to the interior of enclosure 39 via one or more conduits 45. For applications where the substrates are to be coated at the next manufacturing station, system 43 may be operated, for example, to condition the cooling gas to 70° F. and 50% relative humidity before return to enclosure 39. Rather than pulling the cooling gas into the interior of shroud 32 in the manner just described, it also is within the scope of our invention to provide means such as a fan for pumping air from the interior of enclosure 39 into the interior of shroud 32. For polycarbonate substrates with a diameter of about 5 inches and a thickness of about 0.050 inch, spaced from each other as previously discussed and engaged by supports 18, 20, 24 around a circle of about 18 inches diameter at support 18, the flow rate of conditioned gas across the surfaces of the disks may be in the range of 50 to 1,000 feet per minute. As many as two hundred substrates may be supported on supports sized in this manner.

Figure 2:
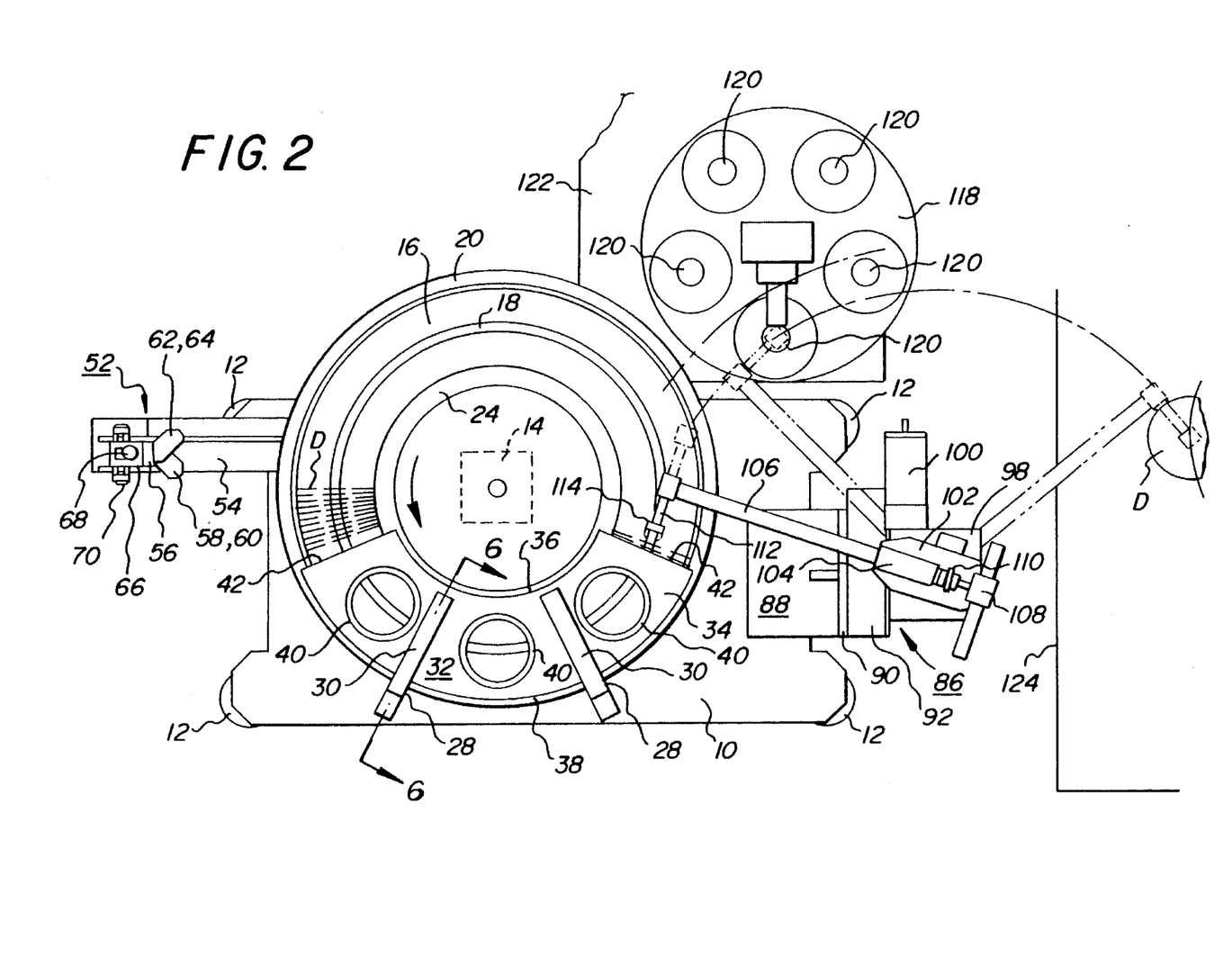
FIG. 2 illustrates a top view of the apparatus of FIG. 1.

The overall operation of the apparatus thus far described commences when a hot substrate D is placed for engagement by supports 18, 20, 24 just outside the inlet end of shroud 32, on the left as viewed in FIG. 2. The temperature of the substrates when placed on the supports typically will be in the range of 150° to 200° F., due to some drop in temperature as the substrates are moved through enclosure 39 from the molding equipment to the cooling equipment. Indexer 14 is then operated under the control of a conventional controller, not illustrated, to step dial 16 one step or one tooth pitch counter-clockwise as viewed in FIG. 2, to permit the next substrate to be placed. This process continues as more substrates are added and the previously placed substrates move beneath shroud 32. While the substrates are stepping along beneath shroud 32, a flow of air or other cooling gas is drawn past legs 22, 26, upward along the faces of each substrate and out through ducts 40 and trunks 41 to air conditioning unit 43, where its temperature and humidity are adjusted prior to return to enclosure 39 through conduit 45. Additional cooling gas may be admitted through holes in dial 16, not illustrated. As a result of this stepped movement through shroud 32 and the steady flow of conditioned cooling gas, the substrates may be cooled in about five to fifteen minutes to the ambient temperature of 70° F. by the time they reach the outlet end of shroud 32, on the right as viewed in FIG. 2.

Figure 3:
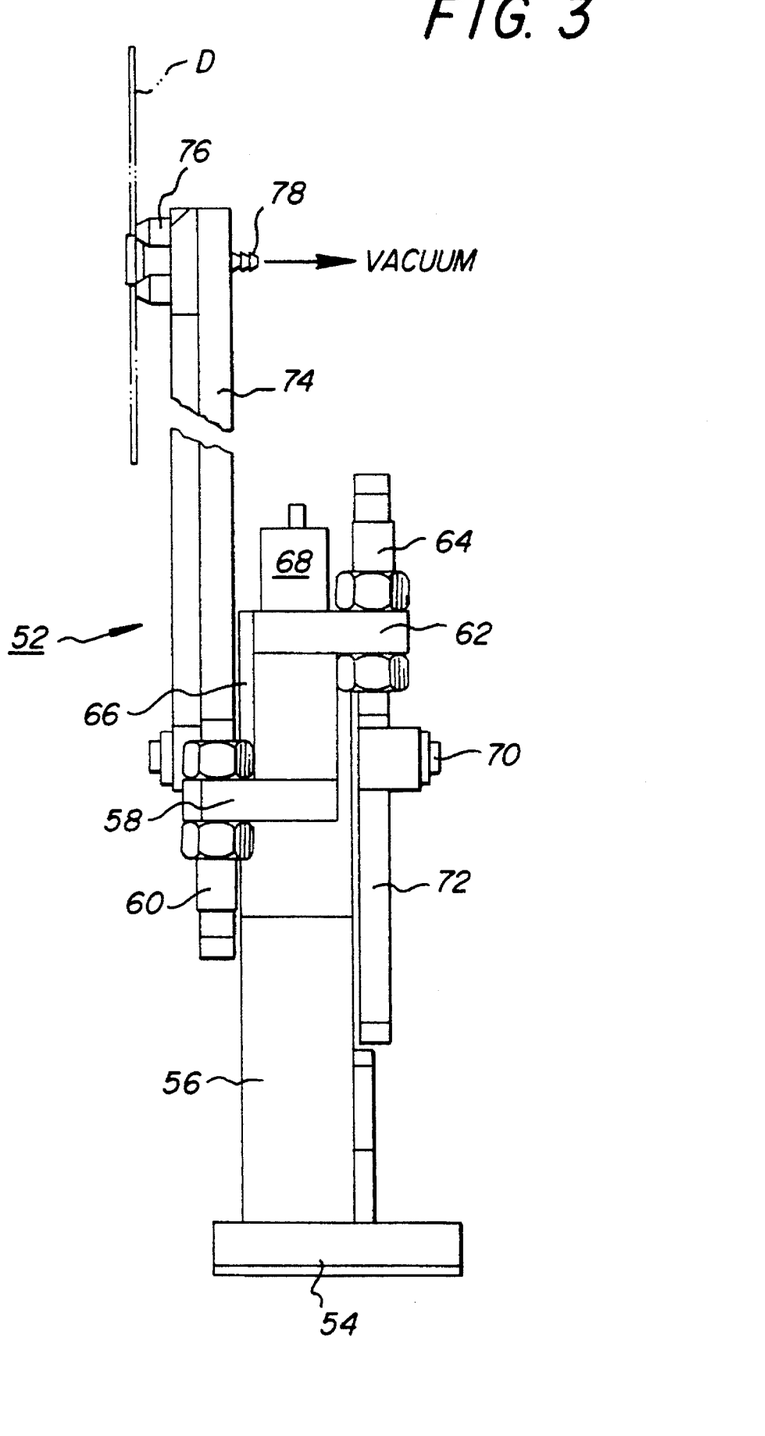
FIG. 3 is a view taken along line 3—3 of FIG. 1, illustrating the hot disk transfer mechanism of our invention.
Figure 4:
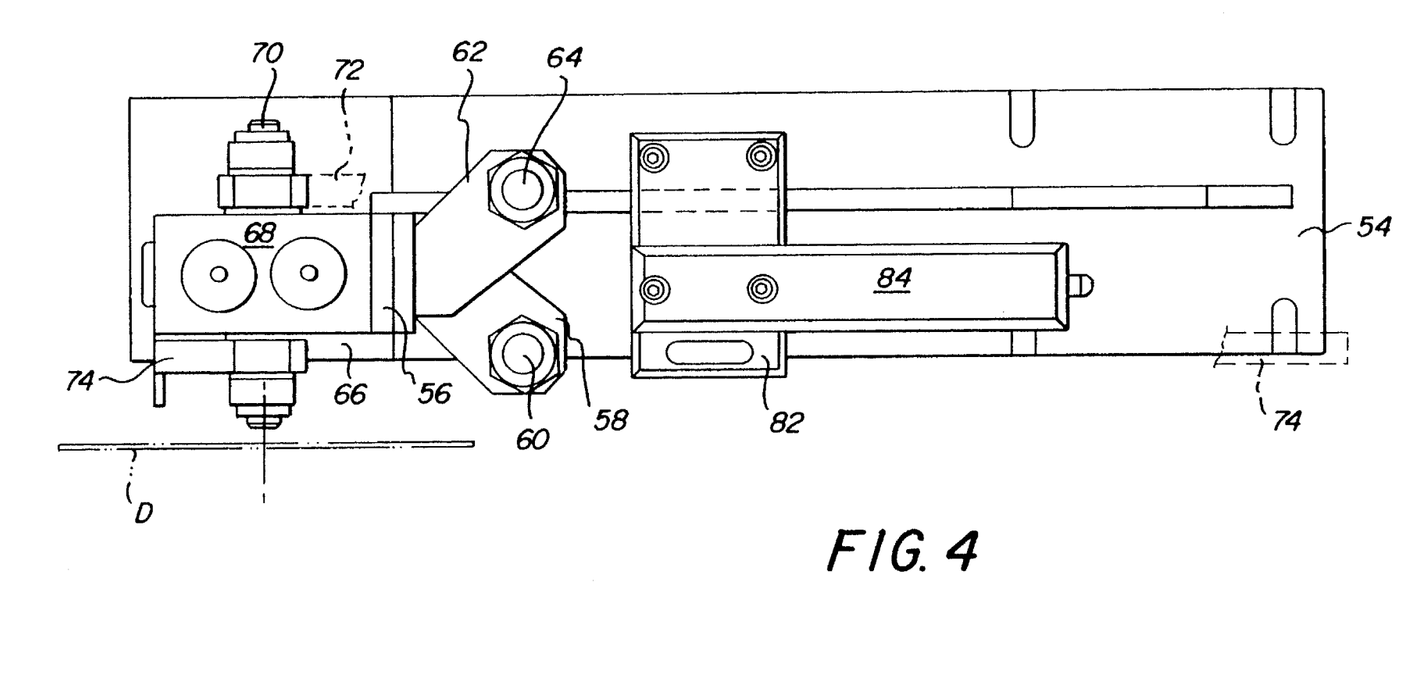
FIG. 4 illustrates a top view of the mechanism of FIG. 3.

FIGS. 1, 3 and 4 illustrate the details of the mechanism which places hot substrates on the supports at the inlet end of the shroud. A hot substrate removal mechanism 50, illustrated fragmentarily in phantom in FIG. 1, removes each hot disk or substrate D from the preceding molding equipment, not illustrated, and presents the substrate in a vertical orientation to a hot disk transfer mechanism 52. Mechanism 50 is conventional and typically comprises a vacuum chuck for engaging one side of each substrate. Mechanism 52 comprises a mounting bracket 54 supported by table 10 and an upright support arm 56 joined to bracket 54. A bracket 58 extends from support arm 56 toward dial 16 and supports a down motion shock absorber 60. A bracket 62 extends from support arm 56 above bracket 58 and toward dial 16 and supports an up motion shock absorber 64. A lateral support arm 66 extends from support arm 56 away from dial 16 and supports a conventional pneumatic rotary actuator 68 having an output shaft 70. Fixedly mounted on one end of shaft 70 is a stop arm 72, shown rotated 90° downward out of actual position in FIG. 3 and in phantom lines in FIG. 4. On the opposite end of shaft 70 is fixedly mounted a transfer arm 74 having a conventional vacuum chuck 76 mounted at its outer end and connected to vacuum source, not illustrated, by means such as a nipple 78. Also supported by mounting bracket 54 is an upright support arm 80 on which are mounted a stop 82 for engaging arm 74 and chamfered guide block 84 for accurately positioning arm 74 above supports 18, 20, 24. Block 84 is shown only fragmentarily in FIG. 1.

In operation of the mechanism of FIGS. 3 and 4, actuator 68 is operated to swing transfer arm 74 to its raised position shown in FIGS. 1 and 3, where mechanism 50 presents a substrate to vacuum chuck 76. In the raised position of arm 74, stop arm 72 engages up motion shock absorber 64. When the substrate has been acquired by chuck 76, mechanism 50 moves away to acquire the next hot substrate. Actuator 68 then swings transfer arm 74 downward to its horizontal position illustrated in phantom in FIG. 1; so that, arm 74 engages down motion shock absorber 60 and stop 82 and is guided by block 82 to ensure that substrate D is engaged by supports 18, 20 and 24. Chuck 76 then releases the substrate. Actuator 68 then swings arm 74 back to its raised position and the process repeats.

FIGS. 1, 2, 7 and 8 illustrate the details of the mechanism which removes cool substrates from the supports at the outlet end of the shroud. A cool disk removal mechanism 86 comprises a mounting bracket 88 supported by table 10. A vertical plate 90 is attached to bracket 88 and supports a linear slide 92 which, in turn, supports a slide bracket 94 on which a top plate 96 is mounted. An indexer 98 is mounted on top plate 96 and driven by a motor and encoder assembly 100. Supported on indexer 98 is a mounting plate 102 on which is mounted a vertical support plate 104. An elongated arm 106 is rotatably supported by plate 104 by means of bearings, not illustrated. Also supported by mounting plate 102 is a conventional pneumatic rotary actuator 108 whose output shaft is operatively connected to rotatable arm 106 by a flexible coupling 110. At its outer end, arm 106 includes a lateral extension 112 on which a conventional vacuum chuck 114 is mounted and connected to a vacuum source, not illustrated, by means such as a nipple 116. As seen in FIGS. 1 and 2, adjacent the assembly comprising supports 18, 20, 24 and cool disk removal mechanism 86 is positioned a rotatable dial or turntable 118 which supports a plurality of upwardly extended stackpoles or spindles 120 on which cool substrates may be accumulated until needed. A table 122 supports dial 118.

In operation of the mechanism of FIGS. 1, 2, 7 and 8, slide 92, indexer 98 and actuator 108 are actuated to rotate, swing and lower arm 106 to the position shown in solid lines in FIG. 2, where vacuum chuck 114 acquires the next cool substrate exiting shroud 32. Slide 92 then raises arm 106 to the position shown in phantom lines in FIG. 2; so that, the substrate is disengaged from supports 18, 20, 24. Indexer 98 then swings arm 106 toward one of stackpoles 120 which has been moved into position to receive a cool substrate. Simultaneously, actuator 108 rotates arm 106 to move the substrate to a horizontal position from which it can be released by chuck 114 onto stackpole 120. Slide 92 may be used to lower each substrate onto the stackpole before release from chuck 114. Alternatively, the cool substrate may be delivered to a subsequent processing station 124 where a coating step may be performed, for example. Actuator 108, indexer 98 and slide 92 then are actuated to return arm 106 to the position for acquiring the next cooled substrate.

Figure 9:
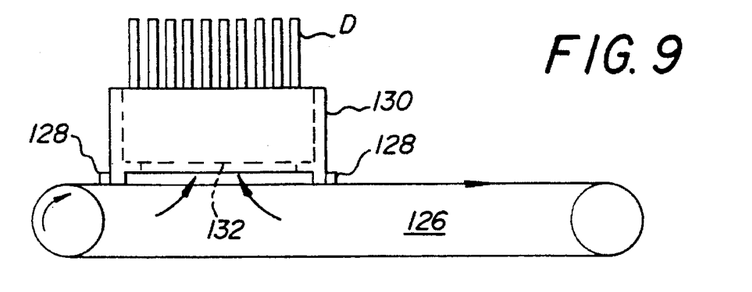
FIG. 9 illustrates schematically an elevation view of another apparatus suitable for practicing the method of our invention.

Although the carousel arrangement of FIGS. 1 to 8 is considered advantageous, those skilled in the art will appreciate that other arrangements may be used to practice the method of our invention in which substantially vertically positioned hot substrates are stepped through a shroud through which conditioned cooling gas is drawn. For example, FIG. 9 illustrates schematically a linear conveyor 126 having a circulating belt or chain with flights 128. Positioned between the flights is a carrier box or frame 130 having internal side slots, not illustrated, in which a plurality of substrates D may be supported in spaced relation. An opening 132 in the bottom of box 130 permits cooling gas to be drawn through the box as the box moves beneath a straight shroud, not illustrated, of the general type shown in FIGS. 1, 2, 5 and 6. Thus, boxes of hot substrates may be placed on the conveyor at one end, while boxes of cooled substrates may be removed from the other end.

Figure 10:
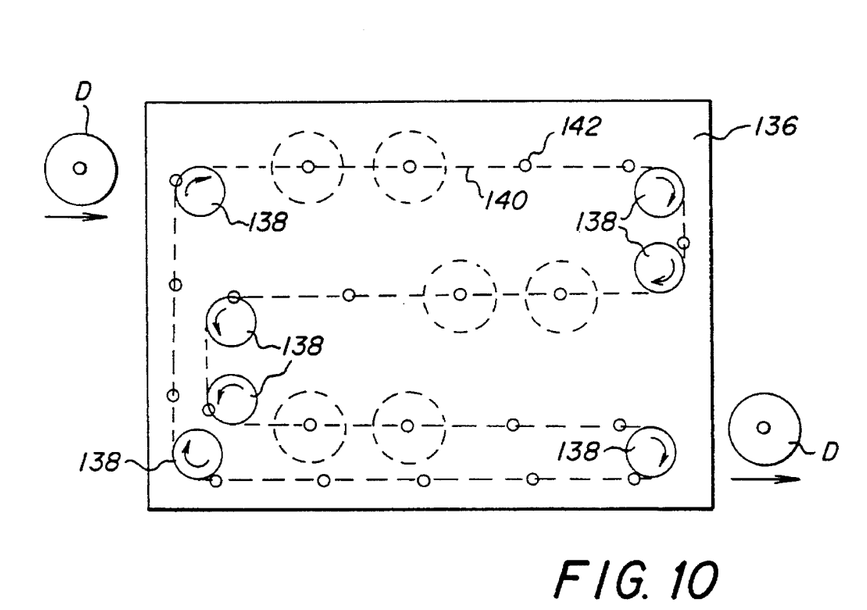
FIG. 10 illustrates schematically an elevation view of still another apparatus suitable for practicing the method of our invention.

FIG. 10 illustrates schematically another approach in which a vertically oriented face plate 136 rotatably supports a plurality of sprockets or drums 138 about which a conventional conveyor chain or belt 140 is trained along a curved, rather serpentine path. Substrate holders 142 may be attached to belt or chain 140 to support substrates D at their center holes in any convenient manner. Thus, as chain or belt 140 is driven around the serpentine path, the substrates move through a shroud, not illustrated, to be cooled. Hot substrates may be introduced at any convenient location and cool substrates removed at any convenient location, as indicated schematically by the arrows.

Figure 11:
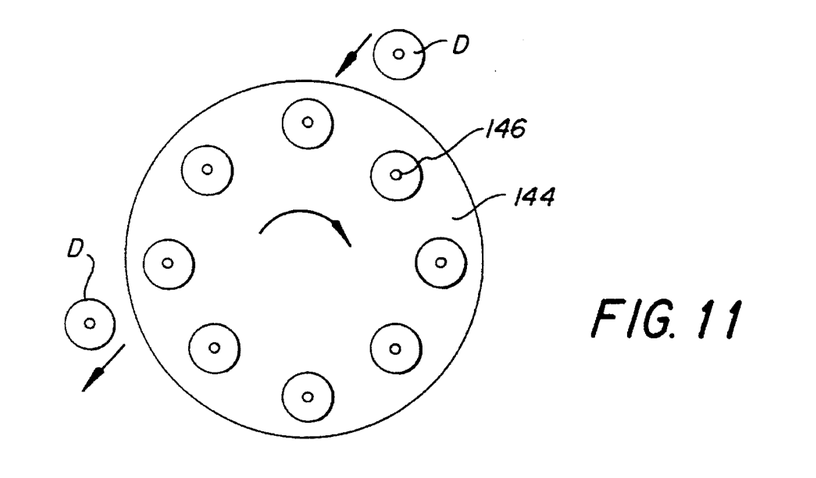
FIG. 11 illustrates schematically an elevation view of yet another apparatus suitable for practicing the method of our invention.

FIG. 11 illustrates schematically still another approach in which a vertically oriented turret 144 is provided with a plurality of substrate holders 146 to support substrates D at their center holes. Thus, as turret 144 is rotated, the substrates move through a shroud, not illustrated, to be cooled. Hot substrates may be introduced and cool substrates may be removed at convenient locations, as indicated schematically by the arrows.

Parts List

10 . . . base plate or table
12 . . . legs
14 . . . motor driven indexer
16 . . . circular mounting plate or dial
18 . . . bottom support gear with upwardly extending or opening teeth
20 . . . outer ring gear with radially inwardly extending or opening teeth
22 . . . legs or spacers for 20
24 . . . inner ring gear with radially outwardly extending or opening teeth
26 . . . legs or spacers for 24
28 . . . support bracket
30 . . . radial arm of 28
32 . . . arcuate hood or shroud
34 . . . top wall
36 . . . radially inner wall extending downward to 24
38 . . . radially outer wall extending downward to 20
39 . . . environmentally controlled enclosure
40 . . . outlet duct
41 . . . gas flow conduit or trunk
42 . . . end wall
43 . . . air conditioning system
44 . . . semicircular opening
45 . . . gas flow conduit
46 . . . inner, arcuate stiffener flange
48 . . . outer, arcuate stiffener flange
50 . . . hot disk removal mechanism
52 . . . hot disk transfer mechanism
54 . . . mounting bracket
56 . . . upright support arm
58 . . . bracket
60 . . . down motion shock absorber
62 . . . bracket
64 . . . up motion shock absorber
66 . . . lateral support arm
68 . . . pneumatic rotary actuator
70 . . . output shaft
72 . . . stop arm, rotated 90° downward in FIG. 3
74 . . . transfer arm
76 . . . vacuum chuck
78 . . . nipple
80 . . . support
82 . . . stop
84 . . . guide block
86 . . . cool disk removal mechanism
88 . . . mounting bracket
90 . . . vertical plate
92 . . . linear slide
94 . . . slide bracket
96 . . . top plate
98 . . . indexer
100 . . . motor and encoder 102 . . . mounting plate
104 . . . vertical support plate
106 . . . arm rotatably supported by 104
108 . . . pneumatic rotary actuator
110 . . . flexible coupling
112 . . . lateral extension of 106
114 . . . vacuum chuck
116 . . . nipple
118 . . . dial or turntable
120 . . . stacking spindles or stackpoles
122 . . . table
124 . . . next processing station
126 . . . linear conveyor
128 . . . flights
130 . . . carrier box
132 . . . opening in bottom of 130
136 . . . vertical face plate
138 . . . sprockets
140 . . . conveyor chain or belt
142 . . . disk holders to grasp center hole
144 . . . vertical turret
146 . . . disk holders to grasp center hole
D . . . disk-shaped plastic substrate for optical disk, with center hole While our invention has been shown and described with reference to particular embodiments thereof, those skilled in the art will understand that other variations in form and detail may be made without departing from the scope and spirit of our invention.

Having thus described our invention in sufficient detail to enable those skilled in the art to make and use it, we claim as new and desire to secure Letters Patent for:

1. Apparatus for cooling hot, polymeric disks having opposite faces and an outer periphery, comprising:
   a frame;
   a first support having a first plurality of spaced members each configured to engage the outer periphery of one of a plurality of the polymeric disks;
   a first mount supported by the frame and operatively connected to the first support to locate the first plurality to engage the polymeric disks at a first location on their outer peripheries;
   a second support having a corresponding second plurality of spaced members each configured to engage the outer periphery of one of the plurality of polymer disks, wherein the first and second pluralities of spaced members each comprise spaced teeth along their respective support, the polymeric disks being engaged with the supports between the teeth;
   a second mount supported by the frame and operatively connected to the second support to locate the second plurality to engage the polymeric disks at a second location on their outer peripheries, whereby each of the polymeric disks is engaged at the first and second locations and supported substantially vertically between the first and second supports;
   a shroud supported by the frame, the shroud being positioned to at least partially enclose the polymeric disks engaged with the first and second supports;
   means for passing cooling gas through the shroud to cool polymeric disks enclosed by the shroud; and
   means for moving the first and second supports along a path within the shroud.

2. Apparatus according to claim 1, further comprising an environmentally controlled enclosure for the apparatus; wherein the means for passing cooling gas comprises at least one opening through the shroud; at least one conduit connected to the opening; and means connected to the conduit for drawing cooling gas from the enclosure, over the opposite faces of the polymeric disks and through the opening, as the polymeric disks move along the path.

3. Apparatus according to claim 1, wherein the path is straight.

4. Apparatus according to claim 1, wherein the path is curved.

5. Apparatus according to claim 1, wherein the path is circular.

6. Apparatus according to claim 1, wherein the first and second supports each comprise a ring and the first and second pluralities of spaced members each comprise spaced teeth around their respective ring, the polymeric disks being engaged with the rings between the teeth.

7. Apparatus according to claim 1, wherein the first and second supports are made from a material having a thermal conductivity in the range of 1 to 10 Btu-in/hr ft$^2$ F. to reduce conduction of heat from the polymeric disks through the supports.

8. Apparatus according to claim 1, further comprising:
   a third support having a corresponding third plurality of spaced members each configured to engage the outer periphery of one of the plurality of polymeric disks; and
   a third mount supported by the frame and operatively connected to the third support to locate the third plurality to engage the polymeric disks at a third location on their outer peripheries, whereby each of the polymeric disks is engaged at the first, second and third locations between the first, second and third supports.

9. Apparatus according to claim 8, wherein the first, second and third supports each comprise a ring and the first, second and third pluralities of spaced members each comprise spaced teeth around their respective ring, the polymeric disks being engaged with the rings between the teeth.

10. Apparatus according to claim 8, wherein the first, second and third pluralities of spaced members each comprise spaced teeth along their respective support, the polymeric disks being engaged with the supports between the teeth.

11. Apparatus according to claim 1, wherein the shroud includes an inlet end and an outlet end, further comprising:
   means for placing hot polymeric disks between the first and second supports at the inlet end; and
   means for removing cool polymeric disks from between the first and second supports at the outlet end.

12. Apparatus according to claim 11, wherein the means for placing hot polymeric disks comprises:
   a bracket supported by the frame;
   means supported by the bracket for selectively holding or releasing one of the polymeric disks; and
   means supported by the bracket for moving the means for selectively holding or releasing from a pickup position spaced from the first and second supports to a placement position adjacent the first and second supports at the inlet end.

13. Apparatus according to claim 12, further comprising a transfer arm pivotably supported by the bracket, the means for selectively holding or releasing being attached to the transfer arm.

14. Apparatus according to claim 11, wherein the means for removing cool polymeric disks comprises:
   a bracket supported by the frame;
   means supported by the bracket for selectively holding or releasing one of the polymeric disks; and means supported by the bracket for moving the means for selectively holding or releasing from a pickup position adjacent the first and second supports at the outlet end to a release position spaced from the first and second supports.

15. Apparatus according to claim 12, further comprising a transfer arm pivotably supported by the bracket, the means for selectively holding or releasing being attached to the transfer arm.

16. Apparatus according to claim 15, wherein the means for moving comprises a vertically moveable slide supported by the frame; and a turntable supported by the slide, the transfer arm being supported by the turntable.

17. Apparatus according to claim 16, wherein the transfer arm is supported for rotation about an axis transverse to an axis of rotation of the turntable.

18. A method for cooling hot, polymeric disks having an outer periphery, comprising the steps of:

providing a first support having a first plurality of spaced members each configured to engage the outer periphery of one of a plurality of the polymeric disks;

locating the first support so that the first plurality engage the polymeric disks at a first location on their outer peripheries;

providing a second support having a corresponding second plurality of spaced members each configured to engage the outer periphery of one of the plurality of polymeric disks, wherein said first and second plurality of spaced members comprise spaced teeth along their respective support, the polymeric disks being engaged with the supports between the teeth;

locating the second support so that the second plurality engage the polymeric disks at a second location on their outer peripheries, whereby each of the polymeric disks is engaged and supported substantially vertically at the first and second locations between the first and second supports;

providing a shroud to at least partially enclose the polymeric disks engaged with the first and second supports;

passing cooling gas through the shroud to cool polymeric disks enclosed by the shroud; and during the passing step, moving the first and second supports along a path within the shroud.

19. A method according to claim 18, wherein the path is straight.

20. A method according to claim 18, wherein the path is curved.

21. A method according to claim 18, wherein the path is circular.

22. A method according to claim 18, further comprising the steps of:

providing a third support having a corresponding third plurality of spaced members each configured to engage the outer periphery of one of the plurality of polymeric disks; and locating the third support so that the third plurality engage the polymeric disks at a third location on their outer peripheries, whereby each of the polymeric disks is engaged at the first, second and third locations between the first, second and third supports.

23. A method for cooling hot, polymeric disks, comprising the steps of:

supporting a plurality of the polymeric disks substantially vertically and in spaced relationship to each other, said spaced relationship being defined by at least two support members, each having a plurality of spaced teeth for engageably supporting outer peripheries of said polymeric disks;

providing a shroud to at least partially enclose the polymeric disks as supported;

passing cooling gas through the shroud to cool the polymeric disks enclosed by the shroud; and during the passing step, moving the polymeric disks as supported along a path within the shroud.

24. A method according to claim 23, wherein the path is straight.

25. A method according to claim 23, wherein the path is curved.

26. A method according to claim 23, wherein the path is circular.

27. Apparatus for cooling hot, polymeric disks, comprising:

at least two support members for positioning a plurality of the polymeric disks substantially vertically and in spaced relationship to each other, said at least two support members having a plurality of spaced teeth each configured to engage the outer periphery of one of a plurality of polymeric disks;

a shroud to at least partially enclose the polymeric disks as supported;

means for passing cooling gas through the shroud to cool the polymeric disks enclosed by the shroud; and means for moving the polymeric disks as supported along a path within the shroud.

28. Apparatus according to claim 27, wherein the path is straight.

29. Apparatus according to claim 27, wherein the path is curved.

30. Apparatus according to claim 27, wherein the path is circular.

* * * * *

UNITED STATES PATENT AND TRADEMARK OFFICE
CERTIFICATE OF CORRECTION

PATENT NO. : 5,585,063
DATED : December 17, 1996
INVENTOR(S) : Daniel A. Slater, et al It is certified that error appears in the above-indentified patent and that said Letters Patent is hereby corrected as shown below:

Column 11, Claim 15, line 1   -- Replace "12" with -- 14 --

Signed and Sealed this

Fourth Day of March, 1997

Attest:

BRUCE LEHMAN

*Attesting Officer*   *Commissioner of Patents and Trademarks*